United States Patent [19]

Date et al.

[11] 4,197,704
[45] Apr. 15, 1980

[54] EXHAUST MANIFOLD FOR INTERNAL COMBUSTION ENGINE

[75] Inventors: Tasuku Date, Tokyo; Takeru Mizoguchi, Kawagoe, both of Japan

[73] Assignee: Honda Giken Kogyo Kabushiki Kaisha, Tokyo, Japan

[21] Appl. No.: 33,865

[22] Filed: Apr. 27, 1979

Related U.S. Application Data

[63] Continuation of Ser. No. 804,574, Jun. 8, 1977, abandoned.

[30] Foreign Application Priority Data

Jun. 11, 1976 [JP] Japan .................................. 51-67730
Jun. 11, 1976 [JP] Japan .................................. 51-67731

[51] Int. Cl.² ........................... F01N 7/00; F01N 3/10
[52] U.S. Cl. ........................................ 60/322; 60/282; 60/313; 60/323
[58] Field of Search ............... 60/282, 322, 323, 312, 60/313

[56] References Cited

U.S. PATENT DOCUMENTS

| 3,653,205 | 4/1972 | Tadokoro | 60/322 |
|---|---|---|---|
| 3,722,493 | 3/1973 | Hartmann | 60/313 |
| 3,726,084 | 4/1973 | Meier | 60/313 |
| 3,799,196 | 3/1974 | Scheitlin | 60/322 |
| 3,864,909 | 2/1975 | Kern | 60/282 |
| 3,898,804 | 8/1975 | Morita | 60/313 |
| 4,022,019 | 5/1977 | Garcea | 60/282 |

FOREIGN PATENT DOCUMENTS

| 966932 | 9/1957 | Fed. Rep. of Germany | 60/313 |
|---|---|---|---|
| 319426 | 9/1929 | United Kingdom | 60/313 |
| 440955 | 1/1936 | United Kingdom | 60/313 |
| 1322495 | 7/1973 | United Kingdom | 60/282 |

*Primary Examiner*—Douglas Hart
*Attorney, Agent, or Firm*—Lyon & Lyon

[57] ABSTRACT

An exhaust manifold assembly for an internal combustion piston engine employs one exhaust tube for each cylinder and a collection chamber for each pair or larger group of exhaust tubes. Each collection chamber is connected to a plurality of exhaust tubes so that the exhaust timing spacing is the same in each collection chamber. A single exhaust reaction chamber is fed from pipes carrying the discharge from each collection chamber. The effect is to reduce backpressure and to improve scavenging efficiency while maintaining relatively high exhaust gas temperature for purification efficiency. The upstream end of each exhaust tube is supported and sealed within an engine exhaust port and the discharge end of each exhaust tube is slidably received within its collection chamber.

3 Claims, 9 Drawing Figures

EXHAUST MANIFOLD FOR INTERNAL COMBUSTION ENGINE

This is a continuation, of application Ser. No. 804,574, filed June 8, 1977, now abandoned.

This invention relates to an exhaust manifold construction for an internal combustion piston engine. It is particularly directed to an engine for use in automotive vehicles, the engine having two, four, six or eight cylinders, for example.

Prior art exhaust systems have employed exhaust passages extending from each cylinder to a collection chamber, but it has been found that exhaust interference is likely to develop between the cylinders to lower the scavenging efficiency, resulting in the lowering of the engine output. It is the general object of this invention to provide an improved exhaust manifold device which is free from such disadvantage and which employs at least an exhaust tube for each cylinder and a plurality of collection chambers. Each exhaust tube is connected to only one collection chamber, respectively, and each collection chamber is connected to a plurality of exhaust tubes so that the exhaust timing spacing is the same in each collection chamber. Thus, in a four cylinder engine having a timing sequence 1—3—4—2, the exhaust tubes from the first and fourth cylinders would connect to a first collection chamber and the exhaust tubes from the second and third cylinders would connect to a second collection chamber. A pipe contains the discharge of each collection chamber, respectively, to a single exhaust reaction chamber. The extended axes of the exhaust tubes connected to any one collection chamber intersect within that collection chamber, and similarly the extended axes of the pipes intersect within the exhaust reaction chamber. In this fashion, backpressure is minimized such that scavenging efficiency is improved, and at the same time the temperature of the exhaust gases is maintained at a high level so that exhaust purification reactions are improved.

Each exhaust tube has an upstream end supported and sealed within an engine exhaust port and has a discharge end slidably mounted and sealed within a collection chamber.

Other and more detailed objects and advantages will appear hereinafter.

Figure 1:
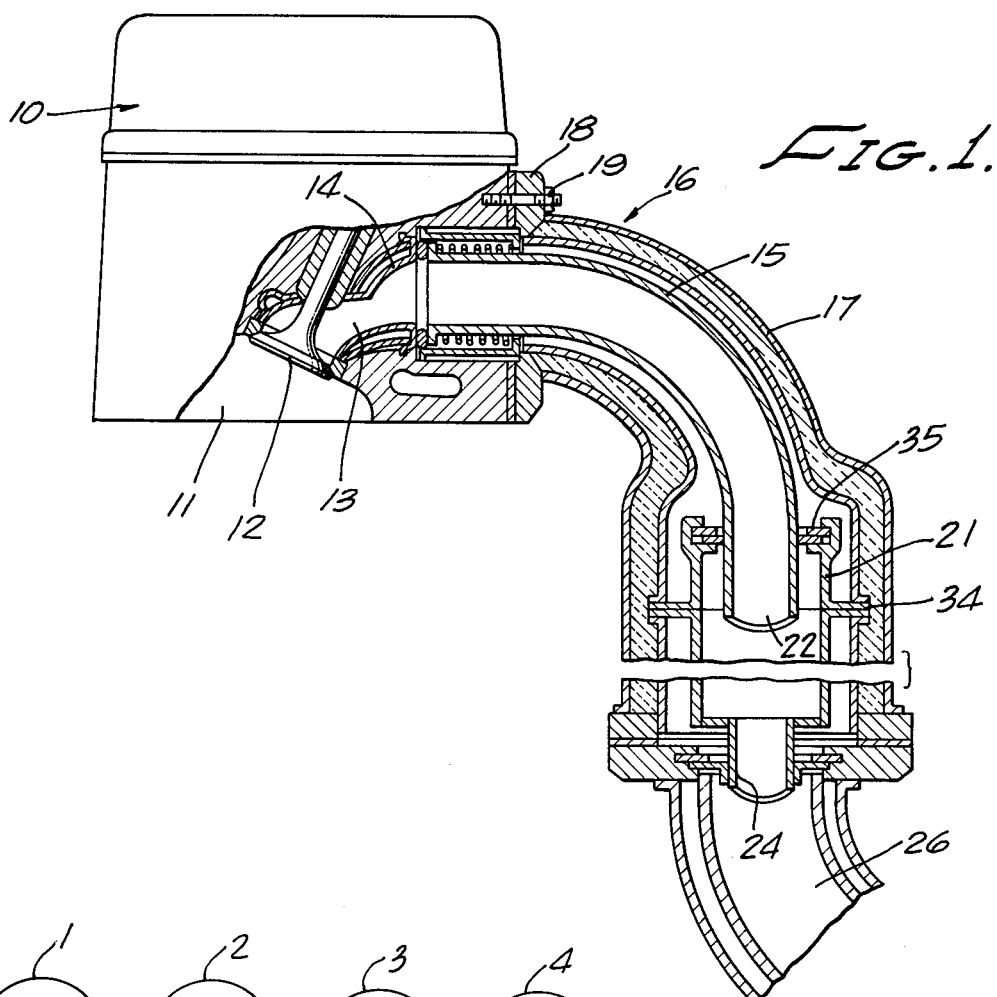
FIG. 1 is a side elevation partly in section showing a preferred embodiment of this invention.

Referring to the drawings, the internal combustion engine generally designated 10 has at least two cylinders each provided with a combustion chamber 11 and an exhaust valve 12. An exhaust manifold generally designated 16 includes an exhaust tube 15 having an intake end 15a received within the exhaust port 13. A double wall insulated housing 17 encloses the exhaust tube 15 to minimize heat loss. The housing 17 is provided with an end flange 18 which is secured to a portion of the engine 10 by means of threaded fastening 19.

Figure 4:
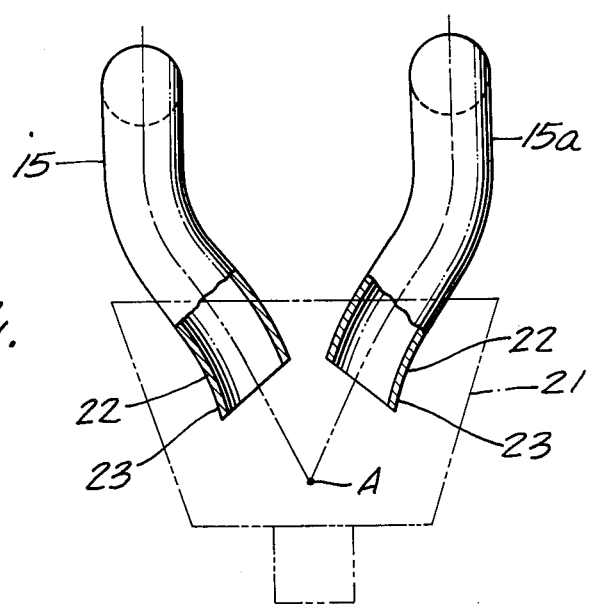
FIG. 4 is diagram partly in section showing how the axes of exhaust tubes intersect within a collection chamber downstream from the exhaust tubes.

The exhaust tube 15 and another similar exhaust tube 15a leading from another exhaust passage in the engine both project into and terminate in the interior of a collection chamber 21. As shown in FIG. 4, the downstream ends 22 of the exhaust tubes are in close proximity and are oriented so that their extended axes intersect within the collection chamber 21 at the point A. The downstream ends of the exhaust tubes 15 and 15a are not square cut but, on the contrary, each has its discharge end cut on a plane inclined in reference to its axis in order to provide exhaust guides 23 on each outer side.

Figure 2:
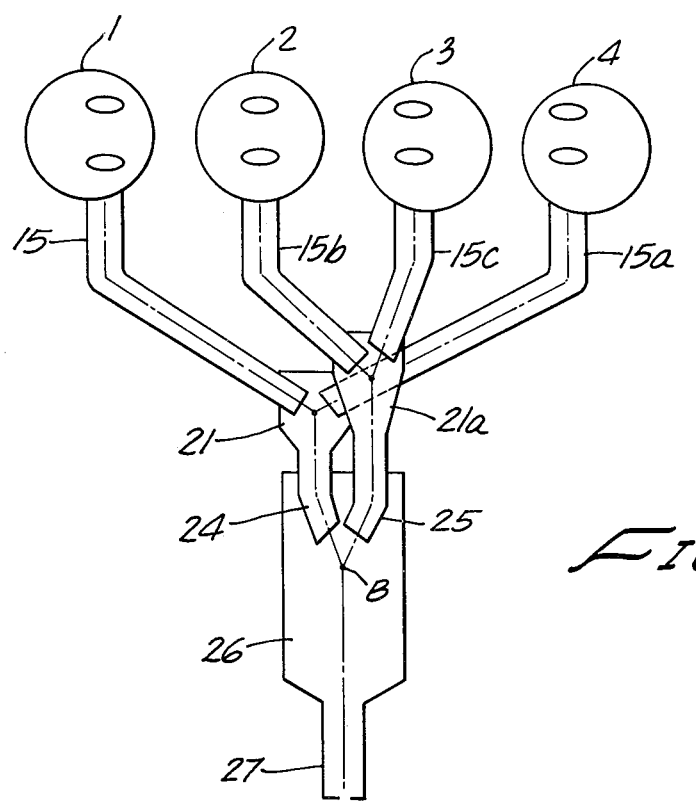
FIG. 2 is a schematic diagram showing how the invention may be applied to a four cylinder engine.

As shown in the schematic diagram of FIG. 2, the four cylinder in-line engine has four exhaust tubes 15, 15a, 15b and 15c. The cylinders 1, 2, 3 and 4 have the firing order 1—3—4—2. The exhaust tubes 15 and 15a both lead to the first collection chamber 21, and the exhaust tubes 15b and 15c both lead to the second collection chamber 21a. Each collection chamber has a discharge pipe 24, 25 remote from the downstream ends of the intersection point A. These discharge pipes 24 and 25 lead to a single exhaust reaction chamber 26, provided with a tail pipe 27. The downstream ends of the pipes 24 and 25 project into and terminate in the interior of the exhaust reaction chamber 26; they are placed in close proximity and have their extreme ends cut on an angle, as shown for the exhaust tubes 15 and 15a in FIG. 4. The extended axes of the pipes 24 and 25 intersect within the exhaust reaction chamber 26 at the point B. The tailpipe 27 is remote from the downstream ends of the pipes 24 and 25 and downstream from the intersection point B.

Figure 3:
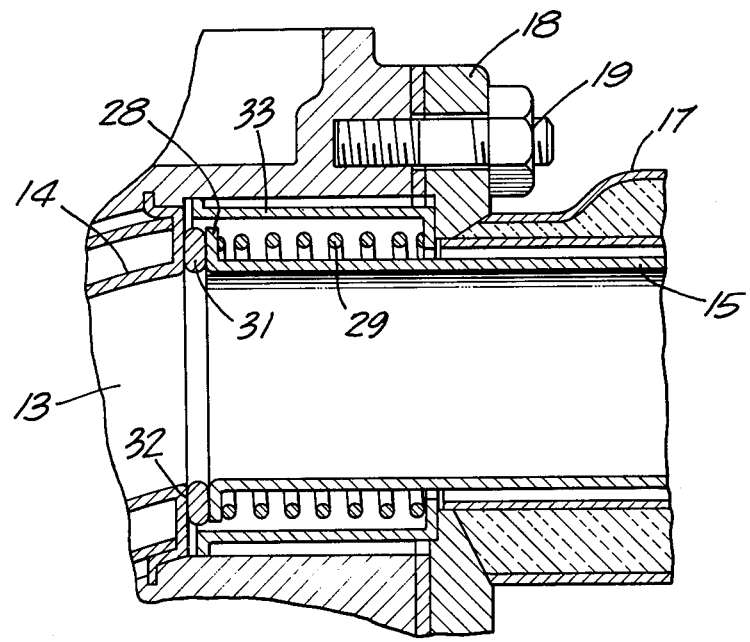
FIG. 3 shows a portion of FIG. 1 on an enlarged scale.

As shown in FIG. 3, each exhaust tube 15 is provided with an end flange 28 which is contacted by a coil compression spring 29 to maintain the seal ring 31 in place between the flange 28 and the end surface 32 of the port liner 14. The spring is confined within a sleeve 33 held in place by the end flange 18 on the manifold housing 17.

The collection chambers 21 and 22 are of similar construction and each may be supported in the manifold housing 17 by means of flanges 34. Seal rings 35 allow differential thermal expansion of the exhaust tubes 15, housing 17 and collection chambers 21 and 21a.

In operation, a pulse of exhaust gas from cylinder No. 1 through exhaust tube 15 reaches collection chamber 21, and the second pulse of exhaust gas from cylinder No. 3 reaches collection chamber 21a through exhaust tube 15c. The third pulse of exhaust gas from cylinder No. 4 reaches collection chamber 21 through exhaust tube 15a. The fourth pulse of exhaust gas in the sequence passes from cylinder No. 2 through exhaust tube 15b into collection chamber 21a. It will be observed that each collection chamber is connected to a pair of exhaust tubes so that the exhaust timing spacing is the same in each collection chamber. The alternating pulses of exhaust gas intersect at an angle downstream from the ends of the exhaust tubes so that the temperature of the exhaust gases remains high and yet the backpressure is maintained at a very low level. A compound flame of high temperature is produced by the exhaust flows from their intersection point forward. Scavenging efficiency and suction efficiency are both improved, while at the same time maintaining efficient exhaust purification.

Figure 5:
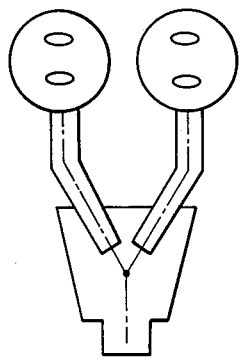
FIGS. 5, 6, 7, 8 and 9 are schematic diagrams similar to FIG. 2, showing how this invention is applied to engines having two, six and eight cylinders.
Figure 6:
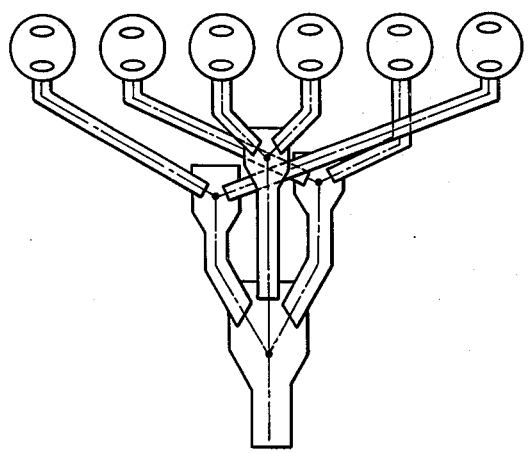
Figure 7:
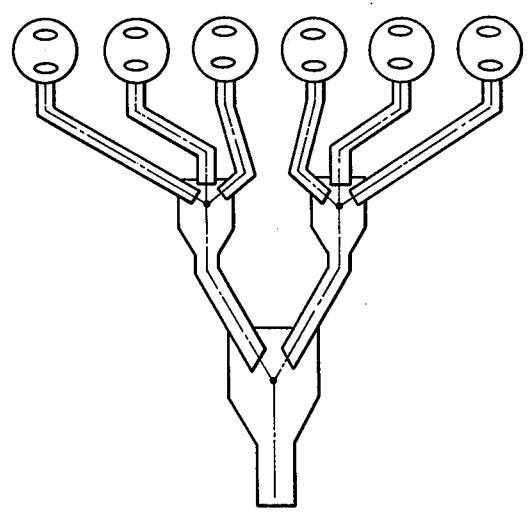
Figure 8:
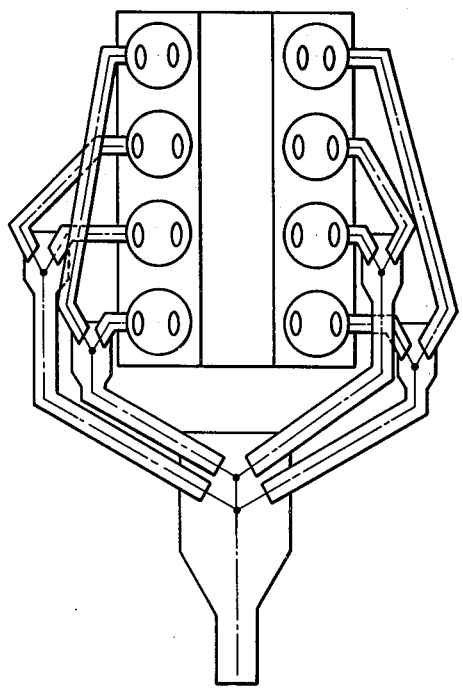
Figure 9:
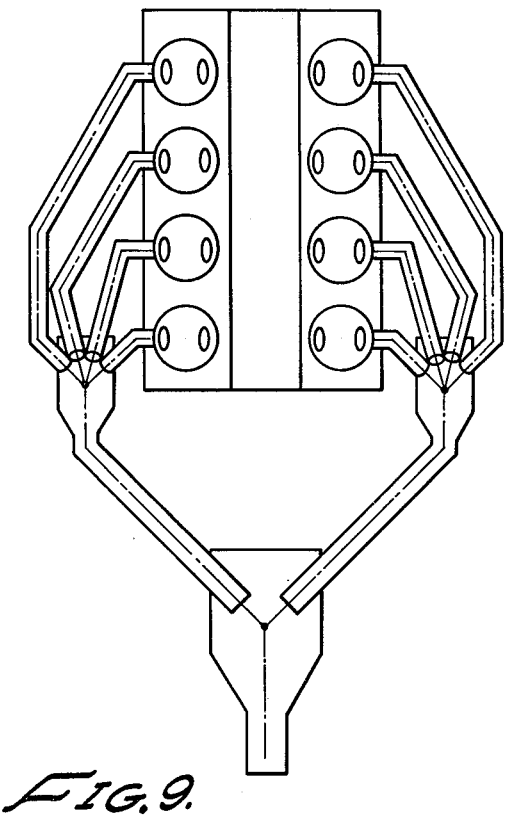

While the diagram of FIG. 2 relates specifically to a four cylinder in-line engine, it will readily be understood that the same feature of invention can be employed in a multicylinder engine having two, four, six, or eight cylinders. While the four cylinder engine of FIG. 2 uses two groups each comprising two exhaust tubes, it will be understood that a two cylinder engine can utilize this invention (FIG. 5), and a six cylinder engine can employ three groups, each group comprising two exhaust tubes, (FIG. 6) or might employ two groups each comprising three exhaust tubes (FIG. 7). In an eight cylinder engine, the invention may be employed by means of four groups of two's (FIG. 8), or two groups of four's (FIG. 9).

It has been determined that good results with a four cylinder in-line engine are achieved when the exhaust tubes 15, 15a, 15b and 15c in such an engine have a length of from 300 mm to 500 mm, and the pipes 24 and 25 have a length of 250 mm to 400 mm. With lengths in these ranges, exhaust interference was prevented, and exhaust pulsating waves of low order are utilized to improve the scavenging efficiency.

Having fully described our invention, it is to be understood that we are not to be limited to the details herein set forth but that our invention is of the full scope of the appended claims.

We claim:

1. For use with an internal combustion piston engine having an even number of cylinders and a predetermined firing order, the improvement comprising, in combination: an exhaust manifold assembly having one exhaust tube for each cylinder, respectively, walls forming an exhaust port for each cylinder, each exhaust tube projecting into one of said exhaust ports, respectively, means supporting and sealing each exhaust tube within its exhaust port, a plurality of collection chambers, each exhaust tube being slidably received within one of said collection chambers, respectively, each collection chamber being connected to a plurality of exhaust tubes so that the exhaust timing spacing is the same in each collection chamber, and a discharge pipe leading from each collection chamber.

2. An internal combustion piston engine having an even number of cylinders with a predetermined firing order, having in combination: walls forming an exhaust port for each cylinder, respectively, an exhaust manifold assembly having one exhaust tube for each exhaust port, respectively, each exhaust tube having an upstream end projecting into an exhaust port and provided with an end flange, a seal ring interposed between said end flange and a wall of said exhaust port, means acting on said seal ring for clamping said seal ring and exhaust tube in position, a plurality of collection chambers, each exhaust tube having a downstream end projecting into and terminating within one of said collection chambers, respectively, means including seal means for slidably supporting each exhaust tube within its collection chamber, each collection chamber being connected to a plurality of exhaust tubes so that the exhaust timing spacing is the same in each collection chamber, a discharge pipe leading from each collection chamber and an insulated manifold housing enveloping each exhaust tube and its collection chamber.

3. An internal combustion piston engine having in combination: walls forming an exhaust port for each cylinder, respectively, an exhaust manifold assembly having one exhaust tube for each exhaust port, respectively, each exhaust tube having an upstream end projecting into an exhaust port and provided with an end flange, a seal ring interposed between said end flange and a wall of said exhaust port, means acting on said seal ring for clamping said seal ring and exhaust tube in position, a plurality of collection chambers, each exhaust tube having a downstream end projecting into and terminating within one of said collection chambers, respectively, means including seal means for slidably supporting each exhaust tube within its collection chamber, each collection chamber being connected to a plurality of exhaust tubes, a discharge pipe leading from each collection chamber, and an insulated manifold housing enveloping each exhaust tube and its collection chamber.

* * * * *